US005151607A

United States Patent [19]

Crane et al.

[11] Patent Number: 5,151,607

[45] Date of Patent: Sep. 29, 1992

[54] CURRENCY VERIFICATION DEVICE INCLUDING FERROUS OXIDE DETECTION

[76] Inventors: Timothy T. Crane, Box 78, Dalton, Mass. 01226; Richard A. Menelly, 87 Belden Rd., Burlington, Conn. 06013; Robert J. Danek, Hendee Rd., R.F.D. #1, Andover, Conn. 06232

[21] Appl. No.: 694,912

[22] Filed: May 2, 1991

[51] Int. Cl.[5] .................... G06K 5/00

[52] U.S. Cl. .................... 250/556; 356/71

[58] Field of Search .................... 250/556; 356/71; 340/825.34

[56] References Cited

U.S. PATENT DOCUMENTS

| | | | |
|---|---|---|---|
| 3,980,990 | 9/1976 | Berube | 340/149 R |
| 4,524,276 | 6/1985 | Ohtombe | 356/71 |
| 4,652,015 | 3/1987 | Crane | 283/91 |
| 4,973,851 | 11/1990 | Lee | 250/556 |
| 4,980,569 | 12/1990 | Crane et al. | 250/556 |

*Primary Examiner*—David C. Nelms

[57] ABSTRACT

An automatic verification device for currency and other security paper containing an embedded security thread first determines the presence of the thread within the paper and then assures that the thread is not present on the paper surface. The device is in the form of a stand-alone currency insertion unit similar to a credit card reader and includes a metal detection circuit to verify the presence of the embedded metal thread. Photo detectors within the unit detect the presence of reflected light off either or both currency surfaces. The currency is verified when the metal is detected and there is no reflection off either surface of the currency paper.

13 Claims, 3 Drawing Sheets

CURRENCY VERIFICATION DEVICE INCLUDING FERROUS OXIDE DETECTION

BACKGROUND OF THE INVENTION

U.S. Pat. No. 4,652,015 entitled "Security Paper for Currency and Bank Notes" describes a security device in the form of a metallized plastic thread that is incorporated within a security paper such as bank notes and other valuable documents during the papermaking process. The security thread is virtually invisible under reflected light yet readily discernible under transmitted light.

U.S. Pat. No. 4,980,569 entitled "Security Paper Verification Device" describes the combination of photo diodes and photo transistors positioned on the opposing sides of the currency to optically ascertain the presence of the security thread within the currency and to determine whether or not the security thread is on the surface of the currency.

Other currency verification devices, such as used with vending machines and the like, detect the presence of iron oxide within the ink that is printed on the face side of U.S. currency to verify the authenticity of the preferred currency. Currency of lower denomination bills can be bleached and photoprinted to a larger denomination using available color photocopy equipment. Since the position of the metallized thread in modern U.S. currency corresponds to the currency denomination and the thread is denominated, such earlier counterfeiting schemes are no longer workable.

Metal detection apparatus in the form of proximity detectors using capacitive circuits and magnetic detectors using tuned resonance circuits are currently employed to rapidly determine the presence of both ferrous and non-ferrous metals for a variety of applications. It is believed that such metal detection circuits in combination with the optical circuits described within aforementioned U.S. Pat. No. 4,980,569 could provide effective and inexpensive means for currency verification in supermarkets, banks and the like.

SUMMARY OF THE INVENTION

The invention comprises an economic currency verification device in the form of a currency pass-through unit that employs a metal detection circuit in combination with an optical circuit to determine the presence and location of the metallized security thread used within the currency paper. The metal detection circuit determines the presence or absence of the metallized thread while the optical circuit ascertains whether the metallized thread is within the currency or the surface.

DESCRIPTION OF THE PREFERRED EMBODIMENT

Figure 1:
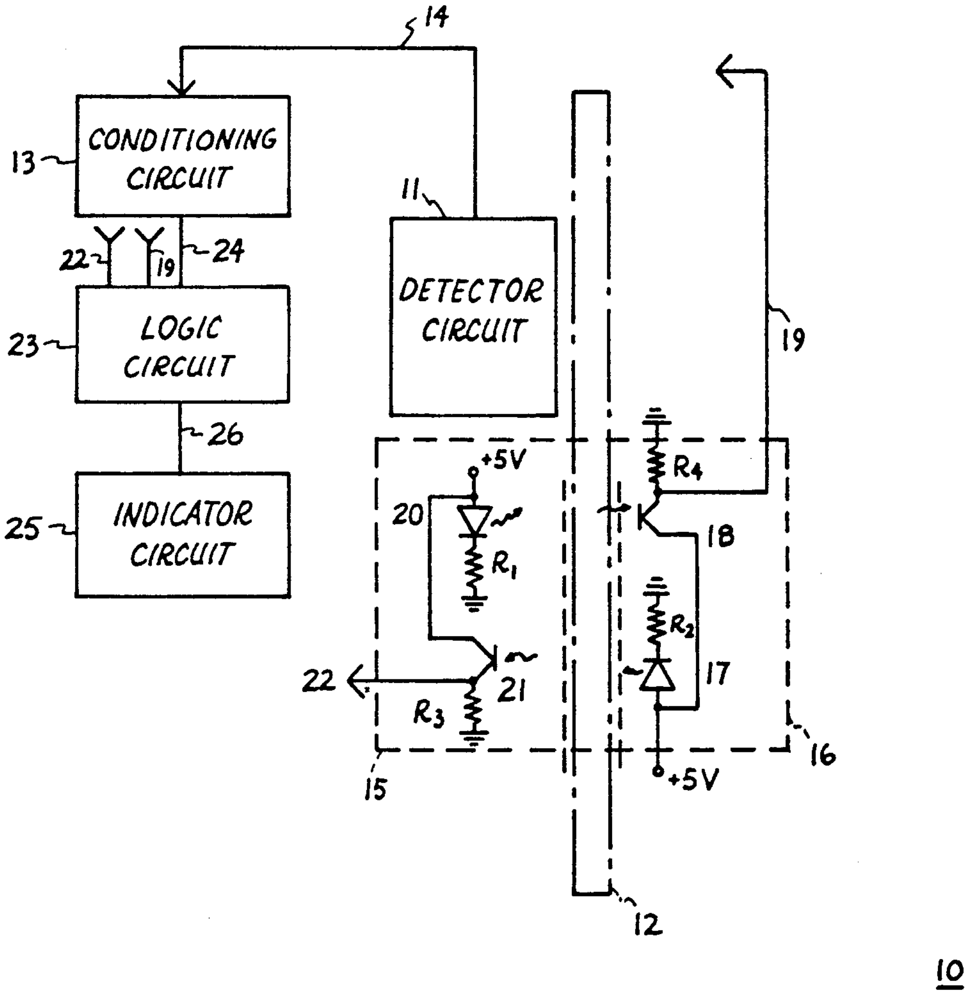
FIG. 1 is a diagrammatic representation of the currency verifier circuit in accordance with the invention.

The currency verifier circuit 10 in FIG. 1 includes a metal detector circuit 11 in combination with a pair of optical detector circuits 15, 16. The ferrous metal detector circuit determines the presence of the magnetic ink used with the currency bill 12 such as described for example in U.S. Pat. No. 3,980,990. A magnetic reader used for credit card validations such as supplied by the American Magnetics Corporation, Carson, CA can also be used to determine the presence of the ferrous metal, with some circuit modification. A first output signal is inputted to the conditioning circuit 13 over the wire conductor 14 when the magnetic signature is detected. The currency bill proceeds through the optical detector circuits 15, 16 such as described in U.S. Pat. No. 4,980,569 and which include photodiodes 17, 20 and photo transistors 18, 21. The photodiode bias is provided by means of a positive voltage source through bias resistors $R_1$, $R_2$ and the cathodes of the photodiodes are connected to negative ground. The photo transistors are connected with ground through resistors $R_3$, $R_4$. As fully described in U.S. Pat. No. 4,980,569 no output signal is provided to the conditioning circuit 13 over wire conductor 19 when no reflected light is received at the photo-transistor 18. Similarly, no output signal is transmitted to the conditioning circuit over the wire conductor 22 in the absence of any reflected light received by the photo-transistor 22. The output of the conditioning circuit is transmitted to a logic circuit 23 over wire conductor 24 and one output signal is transmitted to the indicator circuit 25 over wire conductor 26 in the event that no output signals are transmitted by wire conductors 19, 22 which indicates the absence of a metallic or other reflective material on the surface of the currency bill 12. The output signal received from the metal detector circuit 11 over the wire conductor 14 signifies the presence of the magnetic currency signature which information is compared to the presence or absence of any signal from optical detector circuits 15, 16.

Figure 1A:
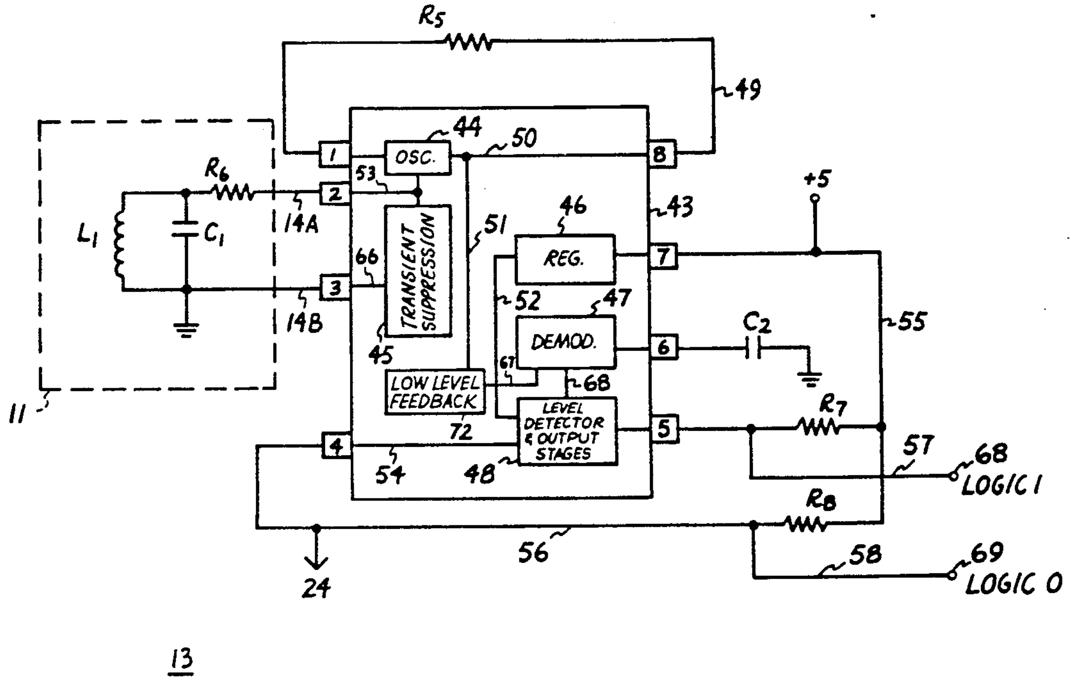
FIG. 1A is a schematic representation of the detector and conditioning circuits within the verifier circuit of FIG. 1.

The detector circuit 11 consisting of the inductance $L_1$, capacitor $C_1$ and resistor $R_6$ is shown connected with the conditioning circuit 13 in FIG. 1A is used for both ferrous and non-ferrous metals and connects with the IC chip 43 over conductors 14A, 14B. The inductance $L_1$ detects the presence of the ferrous metals whereas the capacitance $C_1$ is used to sense the high dielectric non-ferrous metals as will be described below in greater detail. One such IC chip is a type CS109 proximity detector manufactured by Cherry Semiconductor Corporation and operates on the principal of high frequency eddy current losses to detect the presence of a metal. The metal detector circuit 11 is a tuned circuit, consisting of $L_1$ and $C_1$, and acts as the metal sensor. $L_1$ and $C_1$ act as a negative resistance connected between $R_6$ and pin 3 of the IC chip. An oscillator 44, which connects with pin 2 of the IC chip over line 53 and with the metal detector circuit through the transient suppressor 45 and lines 53, 66 changes frequency depending on the value of load resistor $R_5$ which connects between pins 1 and 8 over conductor 49 and the value of the tuned circuit. Initially, when no metal is in proximity to the metal detector circuit 11, the values of $R_5$ and $R_6$ are adjusted such that the frequency of the oscillator 44 appearing on lines 50, 51 causes the output terminals 68, 69 connecting with pins 4–7 on conductors 55-58, resistors $R_7$, $R_8$ and capacitor $C_2$ to be in the inactive states. As a metal is brought in proximity to the metal detecting circuit 11, the inductor $L_1$ causes eddy currents to be induced in the metal, thereby changing the reactance of inductor $L_1$ and causing the metal detector circuit 11 to change its resistance as reflected on pins 2 and 3 causing the oscillator 44 to change frequency. This change in frequency in turn changes the logic state of the terminals 68, 69.

The internal operation of the IC chip 43 is as follows. As described earlier, the oscillator 44 derives its oscillation frequency through the interaction between the load resistor $R_5$ and the tuned circuit consisting of $L_1$, $C_1$, $R_6$. When operating in the absence of a metal, oscillator 44 operates at a predetermined signal frequency $f_1$. This signal is brought into a low level feedback circuit 72 over line 51. The output of the feedback circuit is fed into a demodulator 47 over line 67. The demodulator circuit provides an output relative to the oscillator frequency to the level detector 48 over line 68. The level detector obtains a fixed positive reference voltage through the regulator 46 over line 52. When no metal is proximate to the metal detector circuit 11, the level detector and output stages 48 hold the output terminals in the OFF state. When a metal is proximate to the metal detector circuit 11, the output of the demodulator 47 changes and is sensed by the level detector and output states 48, causing the output terminals 68, 69 to change state. This change is reflected within the logic circuit 23 which connects with the conditioning circuit 13 over conductor 24.

Figure 1B:
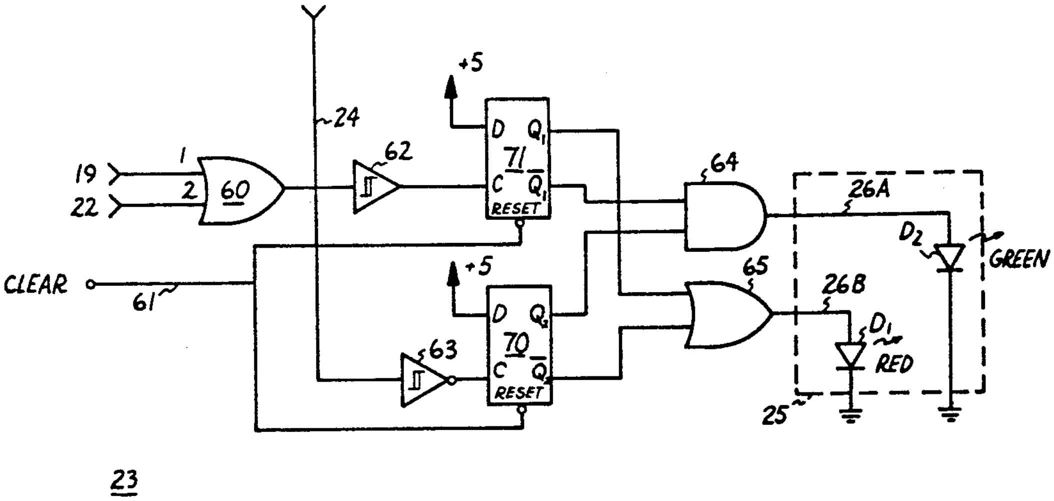
FIG. 1B is a schematic representation of the logic and indicator circuits within the verifier circuit of FIG. 1.

The operation of the logic circuit 23 is best seen by referring now to FIG. 1B where the output conductor 24 from the conditioning circuit 13 is inputted through an inverter 63 to the clock input of a first flip flop 70. At the same time, the outputs from the optical detector circuits 15, 16 (FIG. 1) are inputted over conductors 19, 22 to the inputs of an OR gate 60. The output of the OR gate is inputted to the clock terminal of a second flip flop 71 through a non-inverting gate 62. The $Q_2$ output of the first flip flop 70 is compared with the $\overline{Q}_1$ output of the second flip flop 71 within the AND gate 64. At the same time, the $\overline{Q}_2$ output from the first flip flop 70 is compare with the $Q_1$ output from the second flip flop 71 within the OR gate 65. The outputs of the AND and OR gates 64, 65 are inputted to the indicator circuit 25 over conductors 26A and 26B respectively. An output appearing on conductor 26A turns on the green LED $D_2$ indicating authentic whereas an output on conductor 26B turns on the red LED $D_1$ indicating counterfeit. The circuit is reset by connection between the reset terminals of the first and second flip flops 71, 70 and conductor 61.

The comparison of the output on conductor 24 with the outputs of on conductors 19, 22 to determine the illumination of the green and red LEDs $D_2$, $D_1$ is shown in the following truth tables.

TRUTH TABLES

| GREEN LED LOGIC ($D_2$) | | | RED LED LOGIC ($D_1$) | | |
|---|---|---|---|---|---|
| $\overline{Q}_1$ | $Q_2$ | LED | $Q_1$ | $\overline{Q}_2$ | LED |
| 0 | 0 | OFF | 0 | 0 | OFF |
| 0 | 1 | OFF | 0 | 1 | ON* |
| 1 | 0 | OFF* | 1 | 0 | ON |
| 1 | 1 | ON | 1 | 1 | ON |

*(INITIAL STATE)

Initially, the output from the optical detector circuit as seen on conductors 19, 22 is low (0 logic) indicating the absence of reflection from the surface of the currency. The output pin 4 from the integrated circuit 43 within the conditioning circuit 13 is open so that the output terminal 69 is high (logic 1) to indicate the absence of a ferrous metal in proximity to the inductor $L_1$. Initially, the Q outputs of the flip flops 70, 71 are low and the Q outputs are high being initially set by pulsing the flip flop inputs over clear line 61. The red LED, $D_1$ is On and the green LED $D_2$ is OFF. This is the initial stage for the indicator circuit 25 as indicated on the truth tables. When a ferrous metal oxide is detected, such as the magnetic signature ink on United States currency, the output pin 4 on the integrated circuit chip 43 is changed from a high to a low state which causes a clock signal to be sent to the first flip flop 70 resulting in a high output at the $Q_2$ terminal which is inputted to the AND gate 64 and a low output on the $\overline{Q}_2$ terminal which is inputted to the OR gate 65. Referring to Truth Tables, it is noted that while $Q_1$ and $\overline{Q}_1$ are still in their initial states, the output from the OR Gate 65 causes the red LED $D_1$ to be OFF and the green LED $D_2$ to be ON indicating that the currency bill is authentic. In the event that either of the photo transistors 18, 21 of FIG. 1 transmit an output signal over wire conductors 19, 22 to the logic circuit 23, the logic circuit outputs a signal to the indicator circuit 25 to continue to energize the red LED independent from the output from the metal detector, to indicate that the currency bill is not genuine. The remaining logic states are depicted in the Truth Tables for other indications of authentic and counterfeit currency. The possibility of having both the red LED $D_1$ and green LED $D_2$ ON or OFF at the same time is accordingly zero. The optical detector circuits 15, 16 can be further modified to provide both transmissive and reflective determination in accordance with the aforementioned U.S. Pat. No. 4,980,569 by requiring the absence of a reflected light signal from the photo transistors 18, 21 and the presence of a transmitted light signal to the photo transistors from the corresponding photodiodes 17, 20, if so desired.

Figure 2:
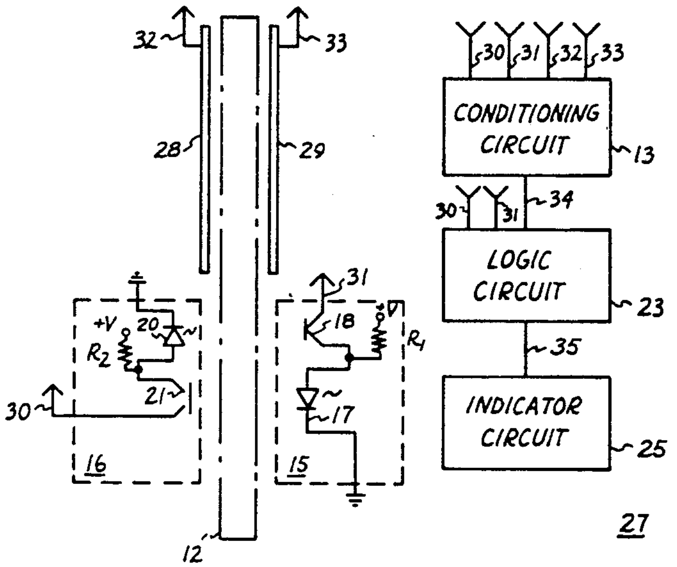
FIG. 2 is a diagrammatic representation of an alternate embodiment of the circuit of FIG. 1.

In the currency verifier circuit 27 of FIG. 2, the currency bill 12 is passed between a pair of opposing metal plates 28, 29 to detect the presence of the non-ferrous metals such as the aluminum used within the security thread and to output an appropriate signal over the wire conductors 32, 33 to a similar conditioning circuit 13. The currency verifier circuit 27 has similar components to that described within the earlier currency verifier circuit 10 of FIG. 1, IA, IB and common reference numerals will be used to identify such common elements. The metal plates 28, 29 form a capacitive coupling with the paper contained within the currency bill 12 to provide a fixed oscillation frequency to the integrated circuit contained within the conditioning circuit 13. The presence of the aluminum strip within the currency bill 12 changes the oscillation frequency to indicate the presence of the security thread thereby transmitting an output signal to the logic circuit 23 over wire conductor 34. The integrated circuit is in the form of a similar integrated circuit chip provided by the Cherry Semiconductor Corporation. A similar pair of optical detector circuits 15, 16 are arranged next to the capacitive plates 28, 29 to determine whether the aluminum thread is on the surface of the currency bill. The photodiodes 17, 20 and photo transistors 18, 21 are arranged such that any reflected light received by the photo-transistors produces an output signal over the corresponding conductors 30, 31 to the logic circuit 23. The presence of the security thread, as indicated by the output signal from the conditioning circuit 13 to the logic circuit 23, is compared to the presence or absence of an output signal received from the photo transistors and the results are transmitted over wire conductor 35 to the indicator circuit 25. The presence of the security thread is indicated by an output signal on wire conductors 32, 33 while the absence of an output signal over wire conductors 30, 31 means that the security thread is not on the surface and thereby energizes the green LED contained within the indicator circuit 25 to indicate that the currency bill is genuine. An output signal received on wire conductors 32, 33 along with an output signal on wire conductors 30, 31 indicates that the security thread is on the surface of the currency bill and thereby continues to energize the red LED within the indicator circuit as described earlier. A more complex and thorough test is provided by the requirement of detecting transmitted light at the photo transistors 18, 21 and the absence of reflected light such as described in the aforementioned U.S. Pat. No. 4,980,569, in combination with an output signal on wire conductors 32, 33 to first determine the presence of the security thread and then determine that the security is within the currency bill and not on either or both surfaces thereof.

Figure 3:
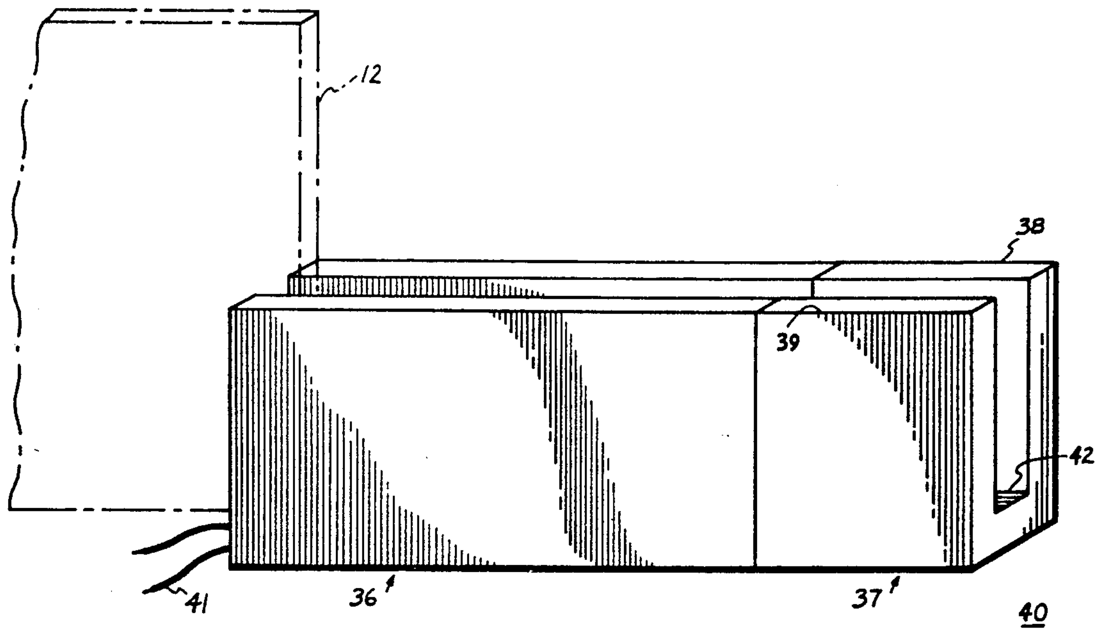
FIG. 3 is a top perspective view of a currency verifier device including the circuit of FIGS. 1 or 2.

The currency verifier circuits of FIGS. 1 and 2 can be incorporated within a stand-alone device as described in the aforementioned U.S. Pat. No. 4,980,569 or as a combined verifier device 40 such as shown in FIG. 3 in combination with a standard metal detector or magnetic reader 36 as supplied by the aforementioned American Magnetics Corporation. The optical detector 37 including the optical detector circuits 15, 16 of FIGS. 1 or 2, can be incorporated within the optical detector 37. When the currency bill 12 is inserted within the slot 42 defined between the two U-shaped circuit boards 38, 39 within the optical detector 37, and metal detector 36, an appropriate output signal is provided over the wire conductors 41 to provide indication that the currency bill is counterfeit or genuine.

It is believed that the metal detector circuit 11 of FIG. 1A can be calibrated to respond to the amounts of metal used with the currency in the form of a metallic signature whereby the specific quantity of metal present on the security thread for each denomination will result in a particular response. The circuit would then determine the presence of the security thread along with the denomination thereof. This is especially helpful when the currency verifier circuit of the invention is used to count the currency along with verification.

A two-fold test for currency verification for currency bills containing a security thread has been described herein. A magnetic detector, magnetic reader, or nonferrous metal detector is used in combination with surface reflective and or transmissive optics to determine the presence of the security thread and to further determine whether the security thread is within currency paper or on either of both surfaces.

Having thus described our invention, what we claim and desire to secure by Letters Patent is:

1. Apparatus for determining authenticity of currency containing a security thread comprising:

- a magnetic card reader having a slot for receiving a magnetically-coded card; and
- means receiving currency adjacent said card reader, said currency receiving means including circuitry detecting a security thread within said currency and indicating authenticity of said currency.

2. A two-fold test device for determining the authenticity of currency containing a security thread comprising in combination:

- means detecting a ferrous oxide marking on either of two surfaces of a currency paper;
- means detecting a security thread intermediate said two surfaces; and
- means indicating authenticity upon determining the presence of said ferrous oxide on either of said two surfaces and the presence of said security thread intermediate said two surfaces, said ferrous oxide detection means comprising an inductive circuit.

3. A two-fold test device for determining the authenticity of currency containing a security thread comprising in combination:

- means detecting a ferrous oxide marking on either of two surfaces of a currency paper;
- means determining a metal intermediate said two surfaces; and
- means indicating authenticity upon determining the presence of said ferrous oxide on either of said two surfaces and the presence of said metal intermediate said two surfaces, said means detecting said metal comprising a capacitive circuit.

4. The device of claim 3 wherein said optical detector circuit comprises opposing photo-diodes and phototransistors.

5. The device of claim 4 including a conditioning and logic circuit connected intermediate said metal detector and said indicating means.

6. A two-fold test device for determining the authenticity of currency containing a security thread comprising in combination:

- means detecting a ferrous oxide marking on either of two surfaces of a currency paper;
- means detecting a security thread intermediate said two surfaces; and
- means indicating authenticity upon determining the presence of said ferrous oxide on either of said two surfaces and the presence of said security thread intermediate said two surfaces, said security thread detection means comprising an optical detector circuit.

7. A two-fold device determining the authenticity of currency paper including a security thread comprising in combination:

- an optical detector circuit determining the presence of a security thread on either of two surfaces of currency paper;
- a metal detector determining the presence of a metal intermediate said two surfaces; and
- an indicator circuit providing an indicating signal upon absence of said security thread on either of said two surfaces and the presence of said metal intermediate said two surfaces.

8. The device of claim 7 wherein said optical detector circuit comprises opposing photo-diodes and phototransistors and said metal detector comprises an opposing pair of capacitive plates.

9. Apparatus determining the authenticity of currency containing a security thread comprising:

- currency paper receiving means;
- capacitive circuit means arranged proximate said currency paper receiver, said capacitive circuit means detecting a plastic strip associated with said currency paper; and means connecting with said capacitive circuit indicating detection of said plastic strip.

10. The apparatus of claim 9 including optical means proximate said currency paper receiver determining whether said plastic strip is within said currency paper or on a surface thereof, said indicating means providing a positive indication when said plastic strip is within said currency paper and a negative indication when said plastic strip is on said surface.

11. Apparatus determining the authenticity of currency paper containing a security thread comprising:

currency paper receiving means;

inductive circuit means arranged proximate said currency paper receiver, said inductive circuit means determining metal characters associated with said currency paper; and means connecting with said inductive circuit indicating detection of said metal characters.

12. The apparatus of claim 11 including optical means proximate said currency paper receiver determining whether said metal characters are within said currency paper or on a surface thereof, said indicating means providing a positive indication when said metal characters are within said currency paper and a negative indication when said metal characters are on said surface.

13. The apparatus of claim 11 wherein said inductive circuit means is calibrated to respond to the amounts of said metal characters associated with said currency paper for denomination recognition.

* * * * *